(12) United States Patent
Halpern et al.

(10) Patent No.: US 10,303,745 B2
(45) Date of Patent: May 28, 2019

(54) PAGINATION POINT IDENTIFICATION

(71) Applicants: Hewlett-Packard Development Company, L.P., Houston, TX (US); Joshua Hailpern, Sunnyvale, CA (US); Niranjan Damera Venkata, Chennai (IN)

(72) Inventors: Joshua Halpern, Sunnyvale, CA (US); Niranjan Damera Venkata, Chennai (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 27 days.

(21) Appl. No.: 15/317,584

(22) PCT Filed: Jun. 16, 2014

(86) PCT No.: PCT/IN2014/000399
§ 371 (c)(1),
(2) Date: Dec. 9, 2016

(87) PCT Pub. No.: WO2015/193905
PCT Pub. Date: Dec. 23, 2015

(65) Prior Publication Data
US 2017/0139878 A1    May 18, 2017

(51) Int. Cl.
*G06F 17/21*  (2006.01)
*G06F 17/27*  (2006.01)

(52) U.S. Cl.
CPC ........ *G06F 17/217* (2013.01); *G06F 17/2715* (2013.01); *G06F 17/2785* (2013.01)

(58) Field of Classification Search
CPC ........................... G06F 17/217; G06F 17/2785

USPC ...................................... 715/243, 251; 704/9
See application file for complete search history.

(56) References Cited

U.S. PATENT DOCUMENTS

| 4,709,348 A | 11/1987 | Horn et al. |
| 6,128,633 A | 10/2000 | Michelman et al. |
| 6,473,730 B1 * | 10/2002 | McKeown .......... G06F 17/2705 704/9 |

(Continued)

FOREIGN PATENT DOCUMENTS

WO    WO-2014/064529 A2    5/2014

OTHER PUBLICATIONS

Brants, T. et al "Topic-Based Document Segmentation with Probabilistic Latent Semantic Analysis." ACM. Nov. 2002. (Year: 2002).*

(Continued)

*Primary Examiner* — Shaun Roberts
(74) *Attorney, Agent, or Firm* — HP Inc. Patent Department

(57) ABSTRACT

Systems and methods associated with pagination point identification are disclosed. One example system includes an interface logic. The interface logic may receive a content element to be arranged within a layout having a first page with a fixed size. The system also includes a pagination logic. The pagination logic may identify a pagination point within a content element based on semantic information from the content element. The system also includes a layout logic. The layout logic may arrange a portion of the content element within the first page based on the pagination point and the fixed size.

18 Claims, 9 Drawing Sheets

(56) References Cited

U.S. PATENT DOCUMENTS

| | | | |
|---|---|---|---|
| 6,772,120 B1* | 8/2004 | Moreno | G06F 17/2715 704/256 |
| 7,296,224 B2 | 11/2007 | Atkins et al. | |
| 7,581,178 B2 | 8/2009 | Hays et al. | |
| 7,801,358 B2* | 9/2010 | Furmaniak | G06K 9/00469 382/173 |
| 8,161,054 B2 | 4/2012 | Dettinger et al. | |
| 8,843,536 B1* | 9/2014 | Elbaz | G06F 17/30864 705/26.1 |
| 9,047,283 B1* | 6/2015 | Zhang | G06F 17/30663 |
| 2002/0052901 A1* | 5/2002 | Guo | G06F 17/27 715/247 |
| 2002/0138528 A1* | 9/2002 | Gong | G06F 17/27 715/254 |
| 2002/0152245 A1* | 10/2002 | McCaskey | G06F 17/3089 715/234 |
| 2003/0055626 A1* | 3/2003 | Miyahira | G06F 17/2775 704/9 |
| 2003/0182631 A1* | 9/2003 | Tsochantaridis | G06F 17/27 715/255 |
| 2004/0122657 A1* | 6/2004 | Brants | G06F 17/2229 704/9 |
| 2006/0224584 A1* | 10/2006 | Price | G06F 17/30616 |
| 2007/0067281 A1* | 3/2007 | Matveeva | G06F 17/2715 |
| 2007/0118356 A1* | 5/2007 | Badino | G06F 17/277 704/10 |
| 2009/0319942 A1* | 12/2009 | Delia | G06F 9/4443 715/785 |
| 2011/0145701 A1 | 6/2011 | Dejean et al. | |
| 2011/0172988 A1* | 7/2011 | Wang | G06F 17/2715 704/9 |
| 2011/0258043 A1 | 10/2011 | Ailaney et al. | |
| 2012/0278704 A1 | 11/2012 | Ying et al. | |
| 2013/0198181 A1* | 8/2013 | Amer-Yahia | G06F 17/30719 707/736 |
| 2013/0297622 A1* | 11/2013 | Clinchant | G06F 17/30687 707/750 |
| 2014/0006982 A1 | 1/2014 | Wabyick et al. | |
| 2014/0019119 A1* | 1/2014 | Liu | G06F 17/2229 704/9 |
| 2014/0281924 A1* | 9/2014 | Chipman | G06F 17/30905 715/236 |

OTHER PUBLICATIONS

Masnick, Mike ~ "Yes: Breaking Web Articles Into Multiple Pages is a Pain"~ Techdirt.com ~ Oct. 3, 2012 ~ 9 pages.

* cited by examiner

Keyword Novelty Approach

Statistical Language Modeling Approach

PAGINATION POINT IDENTIFICATION

BACKGROUND

Layout design for print media (e.g., newspapers, websites) may have scenarios where several content elements compete for limited space. For example, in print media, such as a newspaper, an editor may desire that several articles and other content elements (e.g., images, headlines) appear or be referenced on the first page of the newspaper. Even online, a person building a webpage with an article may desire to place one or more portions of the article on a subsequent page(s) accessed via a link on the first page. Consequently, articles are sometimes broken up into several portions that are placed within a layout in a way that seeks to conform both to content standards and to presentation standards. The process of breaking up an article is referred to as paginating an article.

BRIEF DESCRIPTION OF THE DRAWINGS

The present application may be more fully appreciated in connection with the following detailed description taken in conjunction with the accompanying drawings.

DETAILED DESCRIPTION

Figure 1:
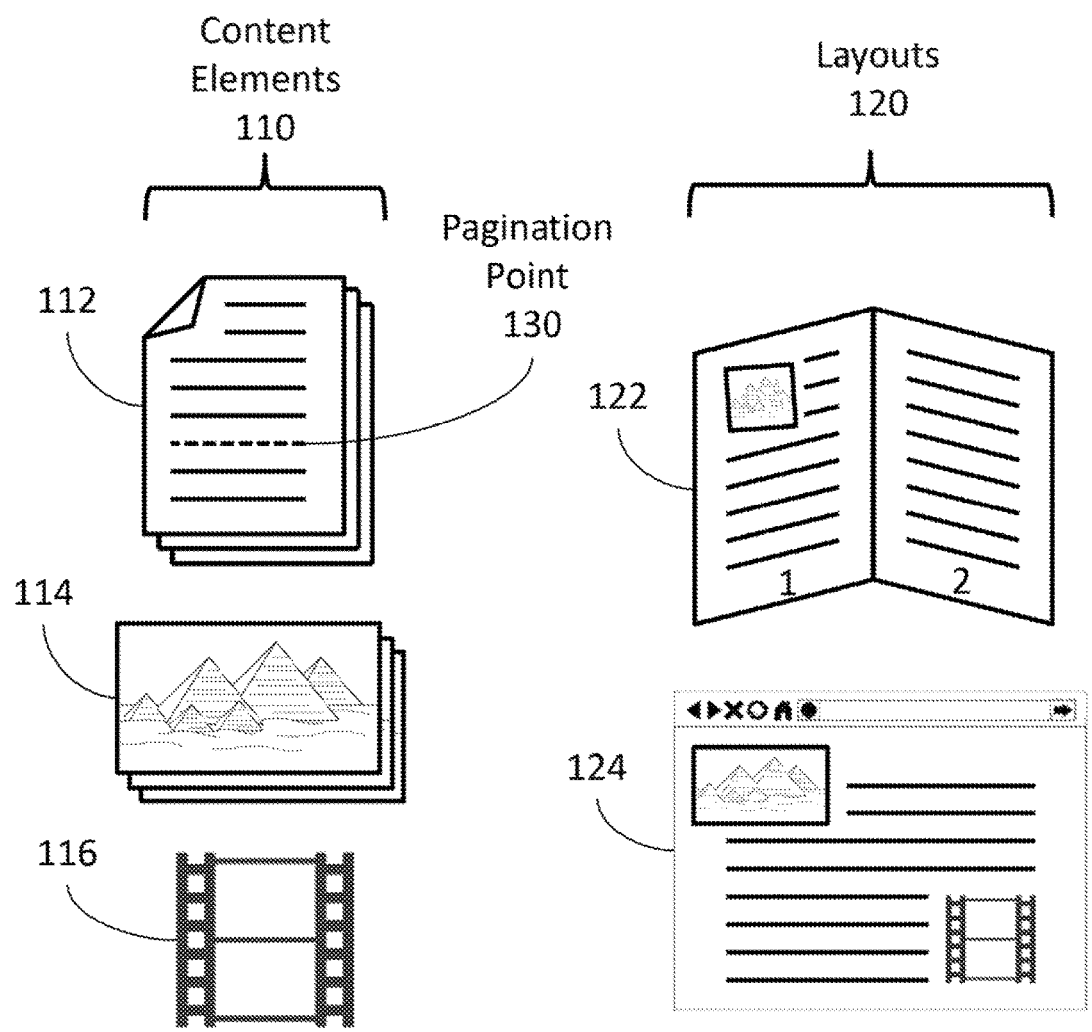
FIG. 1 illustrates example content elements and layouts on which example systems and methods, and equivalents, may operate.

Systems and methods associated with pagination point identification are described. FIG. 1 illustrates several example content elements 110 and layouts 120 on which various systems, methods, and equivalents may operate. Content elements 110 may be, for example, articles 112, images 114, and video elements 116. These content elements 110 may compete for space within the layouts 120.

The layouts may be, for example, fixed size media layouts or variable size media layouts. One example of a fixed size media layout is newspaper 122. One example of a variable size media layout is web page 124. As used herein, a fixed size media layout does not necessarily mean that there is an immutable size to the layout, but instead is intended to convey that there is a limited amount of content that can fit on any given page of the layout. By way of illustration, newspaper 122 can have a certain amount of content on a page, but once that limit is exceeded, a new page must be added to newspaper 122 to add more content. In some cases this may force content elements 110 to be paginated. Variable size media layouts (e.g., webpage 124), on the other hand, can generally can add essentially limitless content to the bottom of the page without having to paginate content elements. However, for readability purposes, advertising purposes, aesthetic purposes, and so forth, it may be nonetheless desirable to paginate content placed into a variable size media layout.

In various examples, articles 112 may be paginated based on semantic information retrieved from the contents of the articles. Presently, layout management (e.g., for a print media or online media) is sometimes performed manually by a professional responsible for ensuring content conforms to various presentation and content standards. Presentation standards may ensure that the layout 120 (including content elements) that ultimately publishes has an aesthetically pleasing visual arrangement that encourages consumption of the content elements 110 placed within the layout. Content standards may ensure that, for example, there is enough content from an article 112 placed within a layout to give a consumer of article 112 enough information to come away with a specified level of understanding regarding a topic of article 112.

To fit content within a layout 120 (e.g., newspaper layout 122, a webpage layout 124), content is sometimes paginated so that a first portion of an article 112 is placed on a first page of layout 120, and subsequent portions are placed later in layout 120. Using newspaper 122 as an example, there is limited space on the front page of newspaper 122, and many articles 112 and images 114 may compete for this space. Instead of putting few articles 112 on the front page of newspaper 122, portions of several articles 112 may be placed on the front page, with remaining portions of articles 112 being placed at various other points throughout newspaper 122. The process of selecting where to divide the articles into the different portions is referred to generally as pagination, and the point selected for pagination is referred throughout this application generally as the pagination point 130.

As mentioned above, pagination is sometimes performed manually. Further, though automated layout systems (e.g., software) exist, these systems emphasize presentation over content. For example, some approaches select a first portion of an article based on length (e.g., one sentence, two sentences, one paragraph, twenty percent rounded up to the next paragraph). Because these techniques divide content based on how information is organized in the document and not based on what information is actually conveyed, these pagination techniques may result in a pagination point being selected that is either too aggressive or too lenient.

A pagination point that is too aggressive may divide an article in a way that may leave a reader of the article without details important for understanding the content of the article, or cause the reader to be misled regarding the content or position of the article. A lenient pagination point may include content that is less relevant to a reader, and ultimately reduce the flexibility of a layout by causing unnecessary content to be included in a space limited area of layout.

To ensure that a pagination point of an article is neither too aggressive nor too lenient, systems and methods disclosed herein describe how to identify pagination points at a "lower bound break point". A lower bound break point may be a point within an article by which point, a reader of the article would have obtained a general understanding of the topic of the article, but has not yet seen some details or nuances. Paginating an article before a lower bound break point may cause a reader to miss a key concept of the article and/or be misled about the content. Paginating an article after its lower bound break point may increase the foot print of the article within a space limited layout. That said, where there is space in a layout, there may be circumstances where it is appropriate to include content from the article after a lower bound break point of the article for aesthetic and/or content related reasons. Additionally, though techniques described herein generally discuss identifying a first pagination point in an article for the purpose of dividing the article into two portions, there may be circumstances where it is appropriate to apply disclosed techniques to identify additional pagination points in an article when the article needs to be broken up into three or more portions.

By way of illustration, an article regarding an election may describe who won, identify the candidates and their respective political parties, the margin of victory, the positions the candidates took during the election, and comments by various parties interested in the election outcome. In this example, it may be determined that the lower bound breakpoint of the election article is after the margin of victory. An overly aggressive pagination system might paginate prior to information regarding the margin of victory, while an overly lenient pagination system might paginate after information regarding the positions of the candidates.

In various examples, pagination may be performed based on a single article or based on a corpus of documents relating to subject matter in an article being paginated. For example, news articles regarding an event may be written differently depending on the source of an article. Though the different articles may be uniquely organized, (e.g., to highlight different aspects of the event, to emphasize a certain viewpoint, because of different authors), the different articles often contain similar key pieces information. Consequently, due to differences between individual articles, identifying a pagination point in an article based solely on the article itself may not identify an optimal pagination point as well as a corpus based approach. Still, because a corpus based approach is not always possible, e.g., for articles for which there are few or no related documents, pagination techniques for both single article and corpus approaches are described.

Consequently, an automatic pagination system that takes into account semantic information based on article text may facilitate pagination that accounts for both presentation constraints and content constraints. One example approach for paginating articles based on semantic information is based on term novelty techniques. A term novelty based approach operates under an assumption that that once a reader is exposed to a term in an article, the reader is aware of that term and its importance to the article. Thus, a term novelty approach seeks to estimate where in an article a reader has been exposed to a sufficient number of terms to understand the article.

By way of illustration, paginating an article based on a term novelty approach may begin by identifying keywords within an article or corpus of documents. In one example, nouns may be distilled from the article or corpus, and the frequencies of the nouns may be identified. When a keyword approach is used based on a single article, the mere frequency of terms may not accurately reflect the importance of various terms in the article. For example, for shorter articles, term frequencies may be too low to accurately identify keywords. Consequently, singular value decomposition (SVD) may be used to identify term importance. SVD may also be useful for identifying the importance of keywords in longer articles and in a corpus of documents. To perform SVD on an article or corpus, the article or corpus is first represented as a sentence-word occurrence matrix (M) encompassing m sentences and n unique words. SVD is then used to decompose matrix M into a product of three matrixes:

$$M = U\Sigma V^* \qquad 1.$$

In equation 1, $\Sigma$ represents a diagonal matrix whose values on the diagonal ($\sigma_i$) are singular values of M. By identifying the four largest $\sigma_i$ ($\lambda_1$-$\lambda_4$), the corresponding top eigenvector columns of V ($\xi_1$-$\xi_4$) may be obtained, where V is a conjugate transpose of V*). A master eigenvector ($\xi'$) may then be generated as a weighted average of $\xi_1$-$\xi_4$, where $\xi_1$-$\xi_4$ are weighted based on $\lambda_1$-$\lambda_4$ according to:

$$\xi' = \frac{1}{4}\Sigma_{i=1}^{4}\lambda_i\xi_i \qquad 2.$$

Figure 2:
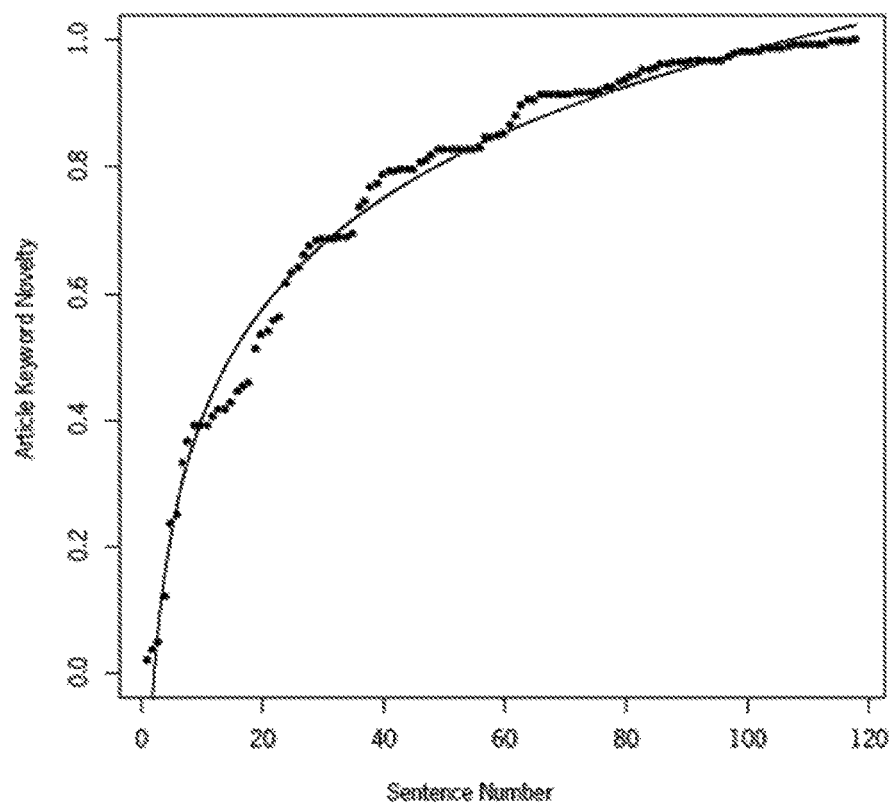
FIG. 2 illustrates an example graph associated with paginating an article using a keyword novelty approach.

Consequently, $\xi'$ may be a vector where each entry in the vector represents a unique keyword, and the value assigned to each keyword may be interpreted as the weight or importance of the keyword to the article or corpus. Given the keyword weights in the article or corpus, sentences in the article being paginated can be assigned values based on the weights of keywords in the sentences, and in preceding sentences. Thus, a weight of a given sentence may be the cumulative sum of keywords seen in and prior to the given sentence. When plotted on a graph (see, e.g., FIG. 2), the sequence of sentence weights (points) may generally fit a logarithmic curve (solid line), and a point on the curve may be selected as a lower bound pagination point in the article.

In one example, the inflection point of the curve may be selected as the lower bound break point in the article being paginated. As used herein, the inflection point is defined as a point in an article where the amount of space needed to introduce new concepts exceeds the weighted values of the new concepts being introduced. In one example, the inflection point of the article may be obtained by taking the log of the number of sentences in the article being paginated, normalizing sentence weights from 0.0-1.0, creating a linear regression where the x-axis is the log of the number of sentences and the y-axis is the normalized sentence weights, and using the x-axis coefficient c (where article length=$e^c$) as the inflection point. Alternatively, the inflection point of the article may be obtained by identifying where the slope of the logarithmic curve crosses the 45° threshold.

Another alternative technique for paginating articles is based on statistical language modeling techniques. Though generally, throughout this application, the distinction between a single article and a corpus of articles is maintained, for the purpose of explaining pagination using statistical language modeling, it is simpler to refer to a corpus, where the corpus may include multiple articles or consist solely of the article being paginated.

Approaches using statistical language modeling estimate an "ideal document" based on keyword frequencies and distribution of the keywords within a corpus. As with the keyword novelty approach described above, applying statistical language modeling to a document begins by identifying high information keywords (e.g., nouns) in a corpus. Portions of the article A being paginated based on the corpus are then compared to the ideal, based on the keywords found in the portions and the keywords likely to be found in the ideal. This comparison is measured using a KLDivergence metric where smaller values indicate that a portion $A_n$ of the article A being paginated is closer to the ideal document. Consequently KLDivergence$_n$ represents the divergence between the first n sentences of article A and an ideal document and is given by:

$$KLDivergence_n = \Sigma_{w_j \in d_k}\left(\ln\left(\frac{q(w_j \mid d_k)}{q(w_j \mid A_n)}\right)\right) * q(w_j \mid d_k)'. \qquad 3.$$

To obtain the $KLDivergence_n$ several other equations are used. First, let D represent the corpus of articles ($d_0$-$d_h$), and let W represent the set of unique keywords ($w_0$-$w_h$) in corpus D. The frequency of a keyword $w_j$ in a document $d_k$, is defined as $f(w_j \mid d_k)$. Given the frequency, the total count of keywords T( ) in a document $d_k$ is given by:

$$T(d_k) = \Sigma_{j=0}^{h} f(w_j \mid d_k) \qquad 4.$$

And the probability p( ) that a keyword $w_j$ is in a document $d_k$ is given by:

$$p(w_j \mid d_k) = \frac{f(w_j \mid d_k)}{T(d_k)}. \qquad 5$$

Similarly, the probability p( ) that a keyword w is in a corpus D is given by:

$$p(w_j \mid D) = \frac{\Sigma_{d_k \in D} f(w_j \mid d_k)}{\Sigma_{d_k \in D} T(d_k)}. \qquad 6$$

Using equations 4, 5, and 6, the probability that a keyword $w_j$ is in a document $d_k$ using Dirichlet Prior smoothing q( ), may be calculated using:

$$q(w_j \mid d_k) = \frac{f(w_j \mid d_k) + \mu * p(w_j \mid D)}{T(d_k) + \mu}. \qquad 7$$

And the probability, using Dirichlet Prior Smoothing q( ), that a keyword $w_j$ is in a portion $A_n$ of the article A being paginated is given by $$q(w_j \mid A_n) = \frac{f(w_j \mid A_n) + \mu * p(w_j \mid D)}{T(A_n) + \mu}. \qquad 8$$

In equations 7 and 8, $\mu$ represents a smoothing constant which is obtained using:

$$m_{w_j} = p(w_j \mid D). \qquad 9$$

$$B_{w_j} = \Sigma_{d_k \in D}\left(\left(\frac{f(w_j \mid d_k)}{T(d_k)} - m_{w_j}\right)^2\right). \qquad 10$$

$$\mu = \frac{\Sigma_{w_j \in W} \frac{B_{w_j}}{m_{w_j} * (1 - m_{w_j})}}{\Sigma_{w_j \in W} \frac{B_{w_j}^2}{m_{w_j}^2 * (1 - m_{w_j})^2}}. \qquad 11$$

Figure 3:
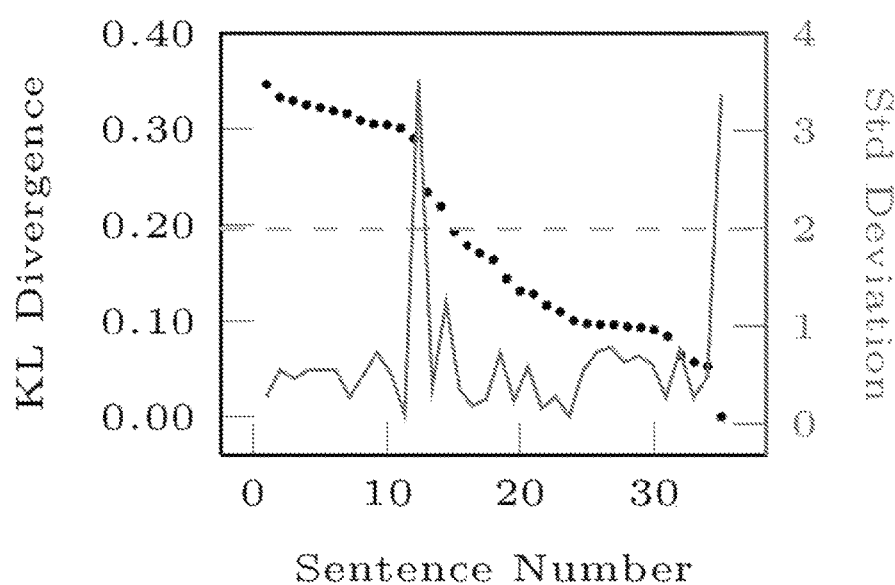
FIG. 3 illustrates an example graph associated with paginating an article using a statistical language novelty approach.

As mentioned above, the $KLDivergence_n$ metric from equation 3, can be calculated (using equations 7 and 8) for each portion $A_n$ of article A. This results in a distribution that can be plotted (see, e.g., FIG. 3), resulting in relatively linear graphs with occasional jumps. In FIG. 3, the plotted points are keyed to the KLDivergence score on the left-y axis, and the solid line is keyed to the standard deviation along the right-y axis. The first of the jumps may correspond to a sentence of article A that will serve as a breakpoint. In FIG. 3, note the large drop in KLDivergence at the first location the standard deviation crosses the dashed line. Automatically detecting these jumps may be performed by calculating differences in KLDivergence between any two portions $A_n$ of article A, determining the mean and standard deviation of the KLDivergence differences, and selecting the first portion An for which the difference in KLDivergence between that portion $A_n$ and $A_{n+1}$ exceeds two standard deviations from the mean.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

Figure 4:
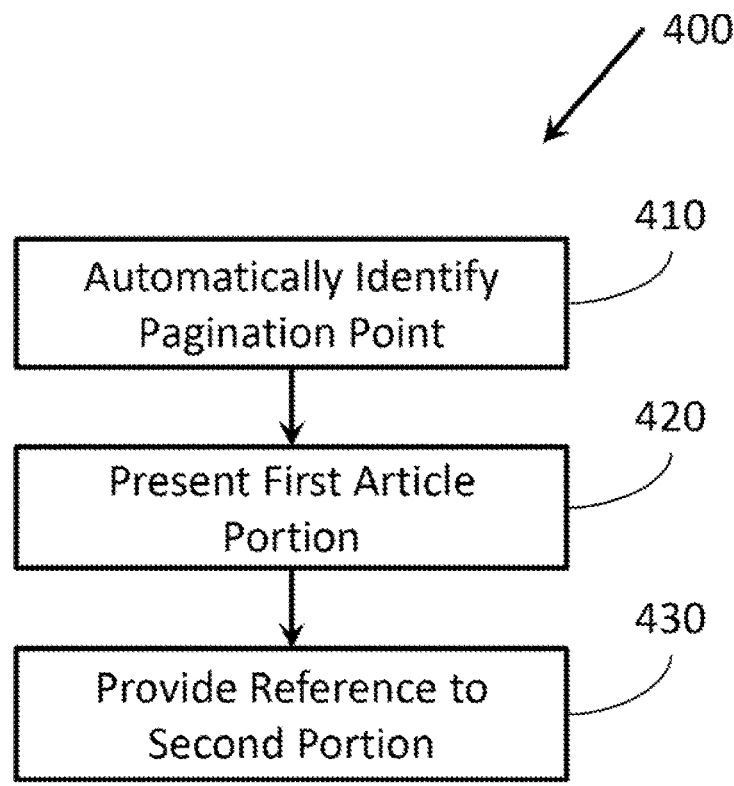
FIG. 4 illustrates a flowchart of example operations associated with pagination point identification.

FIG. 4 illustrates a method 400 associated with pagination point identification. Method 400 may be, for example, embodied on a non-transitory computer-readable medium storing computer-executable instructions. The instructions, when executed by a computer, may cause the computer to perform method 400. Method 400 includes automatically identifying a pagination point in an article at 410. The pagination point identified may be a lower bound break point. The pagination point may be identified based on semantic information retrieved from contents of the article. The pagination point may also be identified based on a corpus of documents related to the article. Paginating based on the corpus may increase information available to a system performing method 400 to help the system identify what terms in the article are important to a reader's understanding of the article.

In one example, the pagination point may be identified using a term novelty approach. As described above, a term novelty approach may seek to estimate where in the article a reader has been exposed to a sufficient number of terms to understand the article. This estimation may take into account the importance of terms within the article based on the frequencies of the terms and/or how the terms are used within the article. When a corpus is used with a term novelty approach, the corpus may provide information that facilitates identifying which terms in the corpus are important to the content of the article being paginated. For example, in the example describing the election mentioned above, a corpus of documents may include many documents that describe the results of the elections including the participants, but fewer longer documents that drill down into the details of the election. If the article being paginated includes the details of the election (e.g., positions of candidates), the corpus may indicate that the pagination point (e.g., a lower bound break point) should be selected to be before content in the article regarding the details.

In another example, the pagination point may be identified using a statistical language modeling approach. As described above, statistical language modeling may seek to compare portions of the article being paginated to a fictitious ideal document regarding the subject matter of the article. When a large difference between the similarities of two consecutive portions is identified, a pagination point may be selected based on the consecutive portions.

Other factors may also be taken into account when identifying the pagination point. For example, the pagination point may be identified based on a user preference, a historical behavior of a user, and so forth. Though these examples are more appropriate for use in combination with a layout format that facilitates variable size layouts (e.g., a webpage), these techniques, and others, may also be taken into account for fixed size layouts. By way of illustration, if a user preference indicates that a user prefers longer articles, the pagination point may be selected later in the article. Similarly, if a user frequently proceeds through several pages of an article paginated across multiple websites, pagination points may be selected earlier in the article to attempt to increase advertising revenue obtained from the user. Consequently, factors in addition to how articles aesthetically fit into a layout may be considered when paginating articles and placing them within a layout.

Method 400 also includes presenting a first portion of the article at 420. The first portion of the article may comprise article contents prior to the pagination point. When there is available space, it may be appropriate to include article contents beyond the identified pagination point when the pagination point identified is a lower bound break point. The first portion of the article may be presented in a media having a fixed page size format. Thus, the first portion of the article may be presented in one of a newspaper and a magazine. The first portion may also be presented in a variable length media format (e.g., a webpage).

Method 400 also includes providing a reference to a second portion of the article at 430. When the article is presented in a fixed size media (e.g., a newspaper, a magazine), the reference may be a jumpline or continuation line that indicates a subsequent page of the layout at which the second portion of the article is to be provided. When the article is presented in a variable size media (e.g., a webpage), the reference may be a hyperlink to the second portion of the article. Some fixed size media (e.g., an e-book, an e-magazine) may also be able to use hyperlinks as references allowing a user easy navigation to the second portion of the article. The second portion of the article may comprise article contents subsequent to the pagination point.

Figure 5:
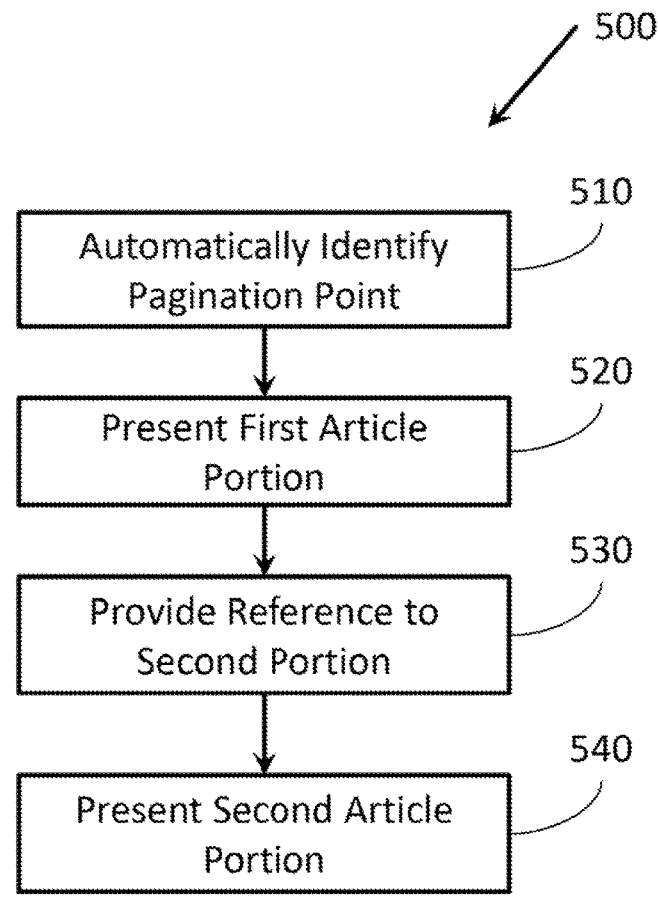
FIG. 5 illustrates another flowchart of example operations associated with pagination point identification.

FIG. 5 illustrates a method 500 associated with pagination point identification. Method 500 includes many actions similar to those described with reference to method 500 (FIG. 5 above). For example, method 500 includes automatically identifying a pagination point of an article at 510, presenting a first portion of the article at 520, and providing a reference to a second portion of the article at 530. Method 500 also includes presenting the second portion of the article at a location identified by the reference to the second portion of the article at 540. In a fixed size media (e.g., newspaper), this may involve printing the second portion of the article at the location identified by the reference. In a variable size media (e.g., website), this may involve displaying the second portion of the article on a webpage reached by a hyperlink serving as the reference.

Figure 6:
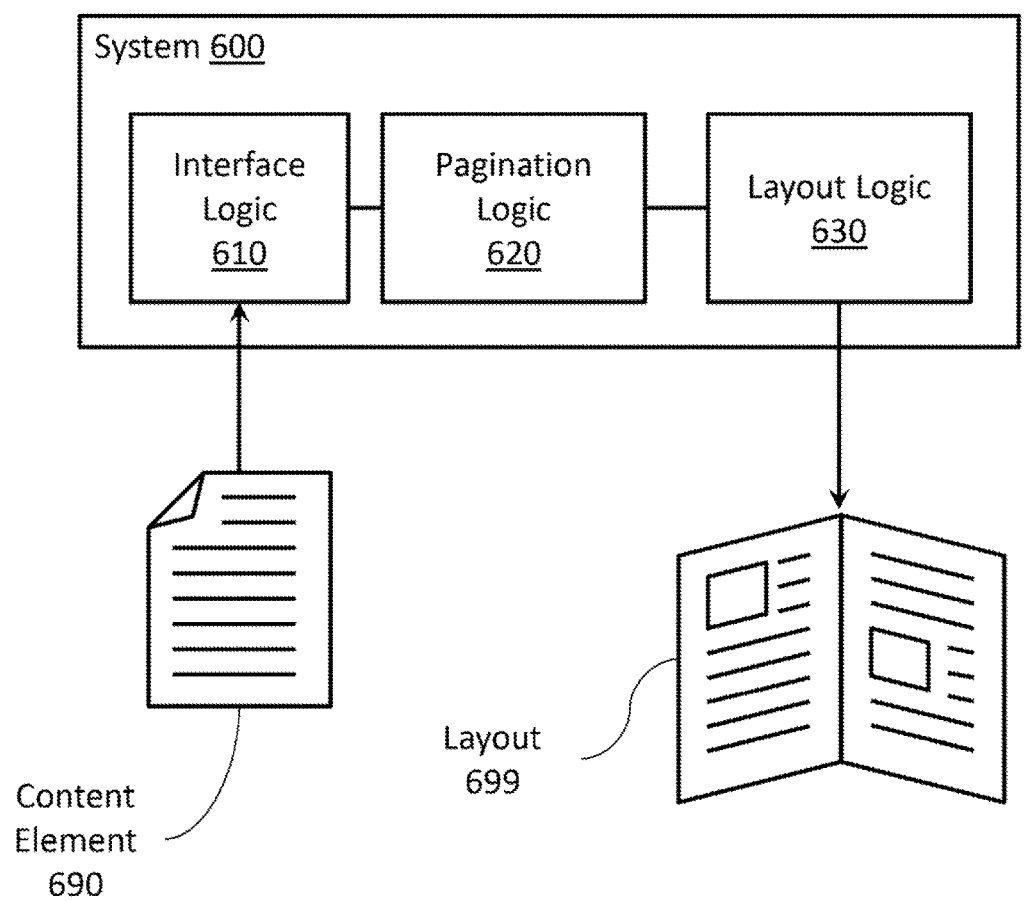
FIG. 6 illustrates an example system associated with pagination point identification.

FIG. 6 illustrates an example system associated with pagination point identification. System 600 includes an interface logic 610. Interface logic 610 may receive a content element 690 to be arranged within a layout 699 having a first page with a fixed size. The content element may be, for example, an article to be placed within a newspaper. Thus, layout 699 may serve as a design document for the newspaper into which various articles, images, and so forth, are arranged prior to printing the newspaper.

System 600 also includes a pagination logic 620. Pagination logic 620 may identify a pagination point within content element 690. Pagination logic 620 may identify the pagination point based on semantic information from content element 690. To identify the pagination point within content element 690, pagination logic 620 may apply term novelty techniques, statistical language modeling techniques, and so forth. In some examples, pagination logic 620 may be optimized to provide better pagination for content elements associated with a specific type of subject matter, content elements written in a specific format, content elements by a specific author, content elements to be placed into a specific type of layout, content elements to be provided to a specific user, and so forth.

Other factors may also be taken into account by pagination logic 620. For example, if layout 699 is associated with an entity that is focused on providing information regarding a specific type of subject matter (e.g., sports) but also provides other information (e.g., world news), pagination logic 620 may be adjusted to ensure that articles associated with prioritized subject matter, sports in this example, include more information than articles having subsidiary subject matter.

System 600 also includes a layout logic 630. Layout logic 630 may arrange a portion of content element 690 within the first page based on the pagination point and the fixed size. In one example, layout logic 630 may arrange a portion of content element 690 on a subsequent page of layout 699. The portion of content element 690 arranged on the subsequent page may be selected based on the pagination point.

As above, when layout 699 is associated with an entity that prioritizes content of certain types of articles over others, layout logic 630 may also give priority to placement of articles associated with articles having the prioritized subject matter. This may include, for example, ensuring articles associated with the prioritized subject matter have less space between their respective parts. This may mean, for example, for an article whose first portion is placed on the front page of a newspaper, placing a subsequent portion of the article on page two of the newspaper, as opposed to deeper within the newspaper.

Figure 7:
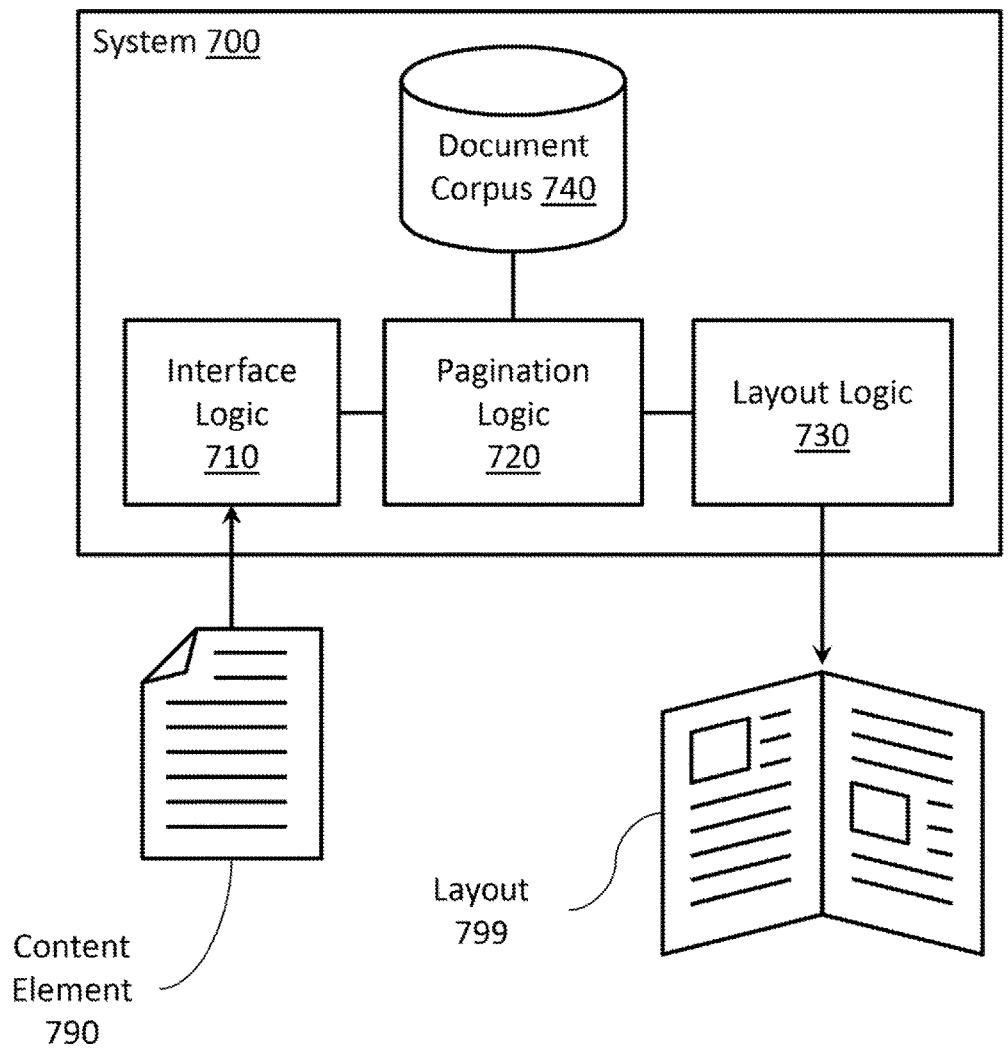
FIG. 7 illustrates another example system for pagination point identification.

FIG. 7 illustrates a system 700 associated with pagination point identification. System 700 includes several items similar to those described with reference to system 600 (FIG. 6). For example, system 700 includes an interface logic 710, a pagination logic 720 to identify a pagination point within a content element 790, and a layout logic 730 to arrange a portion of content element 790 within a layout 799.

System 700 also includes a document corpus 740. Document corpus 740 may be used by pagination logic 730 when pagination logic 740 is identifying the pagination point within content element 790. Document corpus 740 may be a set of documents related to content element 790. For example, if content element 790 is an article describing an outcome of an election, document corpus 740 may include articles from other sources describing the outcome of the election. In one example, the document corpus may be selected by an editor who identifies articles related to content element 790. In another example, the document corpus may be generated automatically based on, for example, a logic that collects articles from various online sources and organizes them by subject matter.

Figure 8:
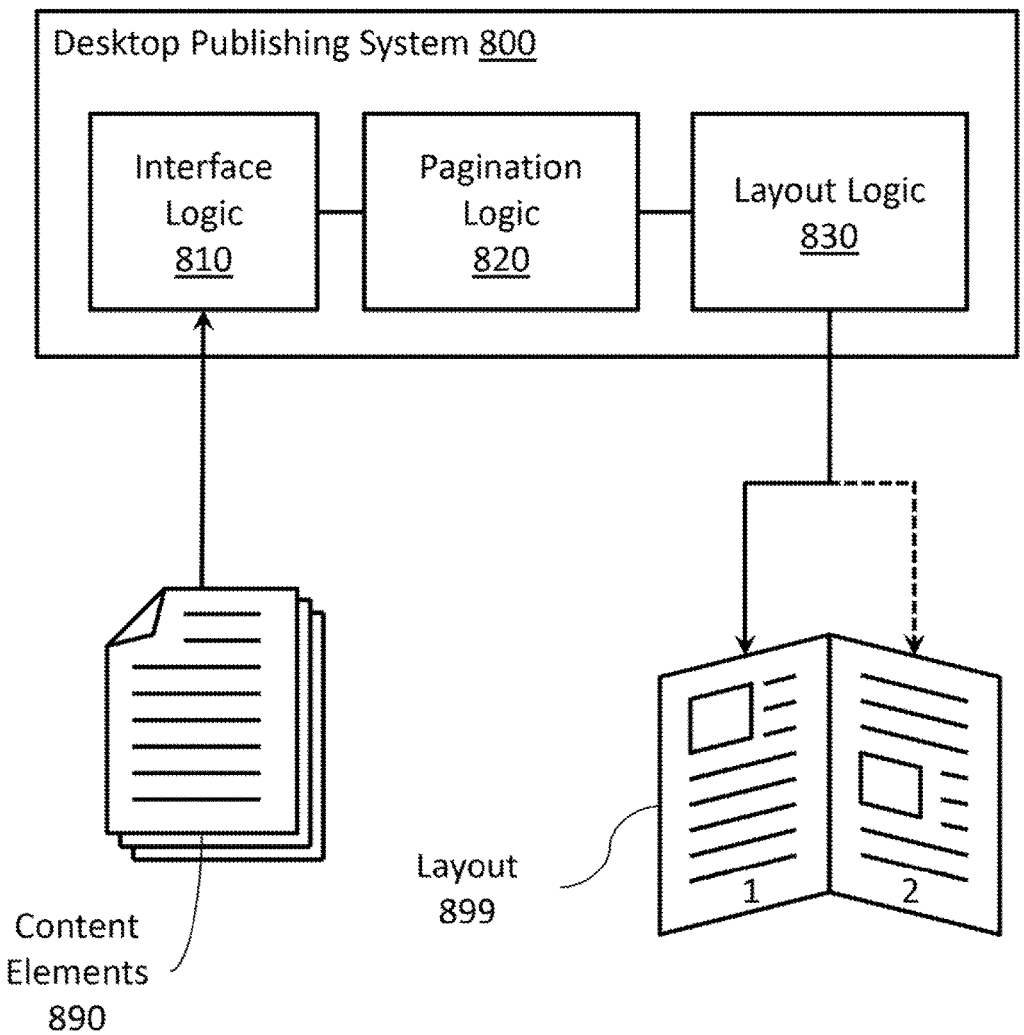
FIG. 8 illustrates an example desktop publishing system for facilitating pagination point identification.

FIG. 8 illustrates a desktop publishing system 800 associated with pagination point identification. Desktop publishing system 800 includes an interface logic 810. Interface logic 810 may receive content elements 890 to be arranged within a layout 899 having a first page with a fixed size. Content elements 890 may include, for example, text elements and image elements. A combined size of content elements 890 may exceed the fixed size of the first page.

Desktop publishing system 800 also includes a pagination logic 820. Pagination logic 820 may identify pagination points within content elements 890. The pagination points may be identified based on semantic information from content elements 890. A pagination point may divide its respective content element into a first portion and a second portion. The first portion may comprise a segment of the content element prior to the pagination point. The second portion may comprise a segment of the content element subsequent to the pagination point.

Desktop publishing system 800 also includes a layout logic 830. Layout logic may arrange first portions of content elements 890 within the first page based on the pagination points and the fixed size. Layout logic 830 may also arrange second portions of content elements within subsequent pages of the layout based on the pagination points.

In one example, pagination logic 820 may identify multiple pagination points in a single article based on differing factors. By way of illustration, different users and types of users may have different preferences regarding article content. For example, a user who is interested in articles relating to sports may prefer sports articles be paginated later in the articles as opposed to other types of articles where the user may be satisfied with minimal details. Consequently, layout logic 830 may arrange first portions of content elements 890 based on the user preferences and their associated pagination points.

Figure 9:
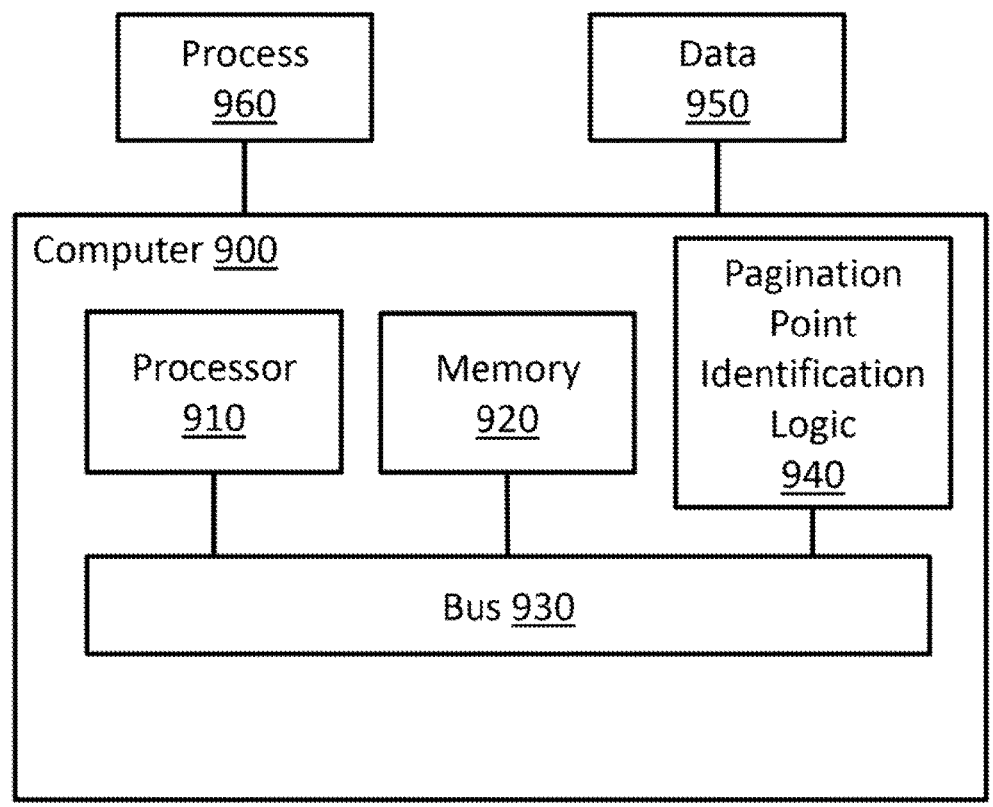
FIG. 9 illustrates an example computing environment in which example systems and methods, and equivalents, may operate.

FIG. 9 illustrates an example computing environment in which example systems and methods, and equivalents, may operate. The example computing device may be a computer 900 that includes a processor 910 and a memory 920 connected by a bus 930. The computer 900 includes a pagination point identification logic 940. In different examples, pagination point identification logic may be implemented as a non-transitory computer-readable medium storing computer-executable instructions in hardware, software, firmware, an application specific integrated circuit, and/or combinations thereof.

The instructions may also be presented to computer 900 as data 950 and/or process 960 that are temporarily stored in memory 920 and then executed by processor 910. The processor 910 may be a variety of various processors including dual microprocessor and other multi-processor architectures. Memory 920 may include volatile memory (e.g., read only memory) and/or non-volatile memory (e.g., random access memory). Memory 920 may also be, for example, a magnetic disk drive, a solid state disk drive, a floppy disk drive, a tape drive, a flash memory card, an optical disk, and so on. Thus, memory 920 may store process 960 and/or data 950. Computer 900 may also be associated with other devices including other computers, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A non-transitory computer-readable medium storing computer-executable instructions that when executed by a computer cause the computer to:

identify terms used in an article, the article comprising a sequence of sentences;

determine an importance of each term;

assign respective individual ones of the sentences a value comprising a sum of term importances in the individual sentence and in preceding sentences;

identify as the pagination point an inflection point of a curve that plots, for the individual ones of the sentences, the value versus a number of the respective sentence in the sequence of sentences;

automatically identify a pagination point in an article about a particular topic based on semantic information retrieved from textual contents of the article, the pagination point indicative of a location in the article at which the textual contents prior to the pagination point convey to a reader all key concepts of the particular topic of the article, wherein the key concepts are a subset of all concepts of the particular topic in the article;

present a first portion of the article, the first portion of the article comprising article contents prior to the pagination point;

and provide a reference to a second portion of the article, the second portion of the article comprising article contents subsequent to the pagination point.

2. The non-transitory computer-readable medium of claim 1, where the instructions also cause the computer to present the second portion of the article at a location identified by the reference to the second portion of the article.

3. The non-transitory computer-readable medium of claim 1, where the pagination point is identified using a term novelty approach that establishes the pagination point at a location in the article at which an amount of space needed to include an additional concept that is not present in the article before the location exceeds an importance of the additional concept to the article.

4. The non-transitory computer-readable medium of claim 1, where the pagination point is identified using a statistical language modeling approach.

5. The non-transitory computer-readable medium of claim 1, where the pagination point is identified based on a corpus of documents having subject matter related to subject matter of the textual contents of the article.

6. The non-transitory computer-readable medium of claim 1, where the first portion of the article is presented in a media having a fixed page size format.

7. The non-transitory computer-readable medium of claim 1, where the media is one of a newspaper and a magazine.

8. The non-transitory computer-readable medium of claim 1, where the pagination point is also identified based on one or more of a user preference, and a historical behavior of a user.

9. The non-transitory computer-readable medium of claim 1, wherein the textual contents prior to the pagination point avoid misleading the reader about the article.

10. The non-transitory computer-readable medium of claim 1, wherein the inflection point is a first sentence in the sequence where a slope of the curve exceeds a predefined threshold.

11. The non-transitory computer-readable medium of claim 10, wherein the predefined threshold is 45 degrees.

12. The non-transitory computer-readable medium of claim 1, wherein the instructions to identify terms further comprise instructions to identify terms used in the article and in a corpus of other articles relating to the given topic.

13. The non-transitory computer-readable medium of claim 1, wherein the instructions to automatically identify the pagination point comprise instructions to:

estimate an ideal document by identifying first terms used in a corpus of documents relating to subject matter in the article;

identify second terms in the article, the article comprising a sequence of sentences;

determine, for each sentence in the article, based on (a) the first terms and (b) the second terms in the sentence, a divergence metric indicative of a closeness of the sentence to the ideal document, calculate a sequence of difference values, each difference value being a difference in the divergence metric between each sequential pair of sentences;

calculate a mean and a standard deviation of the sequence of difference values; and identify as the pagination point a first sentence in the sequence of sentences for which the difference exceeds two standard deviations from the mean.

14. A system, comprising:

an interface logic to receive a textual article concerning a particular topic to be arranged within a layout having a first page with a fixed size;

a pagination logic to automatically identify a pagination point within the textual article based on semantic information from the content element, the pagination point indicative of a location in the article at which the text prior to the pagination point conveys to a reader all key concepts of the particular topic of the article, wherein the key concepts are a subset of all concepts of the particular topic in the article, and wherein the pagination logic:
identifies terms used in the textual article, the textual article comprising a sequence of sentences,
determines an importance of each term, assign respective individual ones of the sentences a value comprising a sum of term importances in the individual sentence and in preceding sentences, and identifies as the pagination point an inflection point of a curve that plots, for the individual ones of the sentences, the value versus a number of the respective sentence in the sequence of sentences; and a layout logic to arrange a portion of the textual article within the first page based on the pagination point and the fixed size.

15. The system of claim 14, where the pagination logic identifies break points within the textual article based on a term novelty approach that establishes the pagination point at a location in the article at which the text prior to the pagination point exposes the reader to a number of terms used in the article, the number of terms sufficient to convey all the key concepts of the article to the reader.

16. The system of claim 14, comprising a document corpus related to subject matter of the textual article and where the pagination logic identifies the pagination point within the textual article based on documents in the document corpus.

17. The system of claim 14, where the layout logic arranges a portion of the textual article on a subsequent page of the layout based on the pagination point.

18. A system to automatically identify a pagination point in an article, comprising:

a processor;

a non-transitory computer-readable medium storing processor-executable instructions that when executed by the processor cause the system to:

identify terms used in textual contents of the article, the article comprising a sequence of sentences;

determine an importance of each term;

assign respective individual ones of the sentences a value comprising a sum of term importances in the individual sentence and in preceding sentences; and identify, as a pagination point indicative of a location in the article at which the textual contents prior to the pagination point convey to a reader all key concepts of the article, an inflection point of a curve that plots, for the individual ones of the sentences, the value versus a number of the respective sentence in the sequence of sentences;

present a first portion of the article, the first portion comprising article contents prior to the pagination point; and provide a reference to a second portion of the article, the second portion comprising article contents subsequent to the pagination point.

* * * * *

UNITED STATES PATENT AND TRADEMARK OFFICE
CERTIFICATE OF CORRECTION

PATENT NO. : 10,303,745 B2
APPLICATION NO. : 15/317584
DATED : May 28, 2019
INVENTOR(S) : Joshua Halpern et al.

It is certified that error appears in the above-identified patent and that said Letters Patent is hereby corrected as shown below:

On the Title Page

Item (72), Inventors, Line 1, delete "Joshua Halpern" and insert -- Joshua Hailpern --, therefor.

In the Claims

In Column 11, Line 9, in Claim 13, delete "document," and insert -- document; --, therefor.

Signed and Sealed this
Nineteenth Day of November, 2019

Andrei Iancu
*Director of the United States Patent and Trademark Office*